United States Patent [19]

Hanson et al.

[11] 4,127,168
[45] Nov. 28, 1978

[54] WELL PACKERS USING METAL TO METAL SEALS

[75] Inventors: Harry R. Hanson, Houston; Hollis A. Baugh, Hempstead, both of Tex.; Thomas W. Childers, Mandeville, La.; James B. Greer, Houston, Tex.

[73] Assignee: Exxon Production Research Company, Houston, Tex.

[21] Appl. No.: 776,799

[22] Filed: Mar. 11, 1977

[51] Int. Cl.² ................................ E21B 33/128
[52] U.S. Cl. .................................. 166/123; 166/131; 166/191; 166/203; 277/236
[58] Field of Search ............... 166/191, 203, 123, 131, 166/138; 277/DIG. 10, 236

[56] References Cited

U.S. PATENT DOCUMENTS

| 1,423,197 | 7/1922 | Critchlow | 277/236 |
| 2,253,776 | 8/1941 | Gaunt | 166/138 |
| 2,791,278 | 5/1957 | Clark, Jr. | 277/236 X |
| 2,948,338 | 8/1960 | Raulins et al. | 166/123 |
| 3,307,736 | 2/1967 | Kisling | 277/236 |
| 3,942,808 | 3/1976 | Gross | 277/236 X |
| 3,990,510 | 11/1976 | Decuir | 166/131 |

Primary Examiner—Ernest R. Purser
Assistant Examiner—William F. Pate, III
Attorney, Agent, or Firm—Michael A. Nametz; Gary D. Lawson

[57] ABSTRACT

An improved well packer for use in sour gas wells is disclosed. The improved packer includes a cylindrical mandrel encircled with a resilient metal seal ring, means for anchoring the packer at a predetermined vertical depth, means for radially expanding the seal rings so as to cause sealing engagement with the casing and mandrel, and ratchet means for maintaining the seal rings in expanded form. The packer is adapted to be run into the cased wellbore on tubing and is particularly useful in sour gas wells.

27 Claims, 11 Drawing Figures

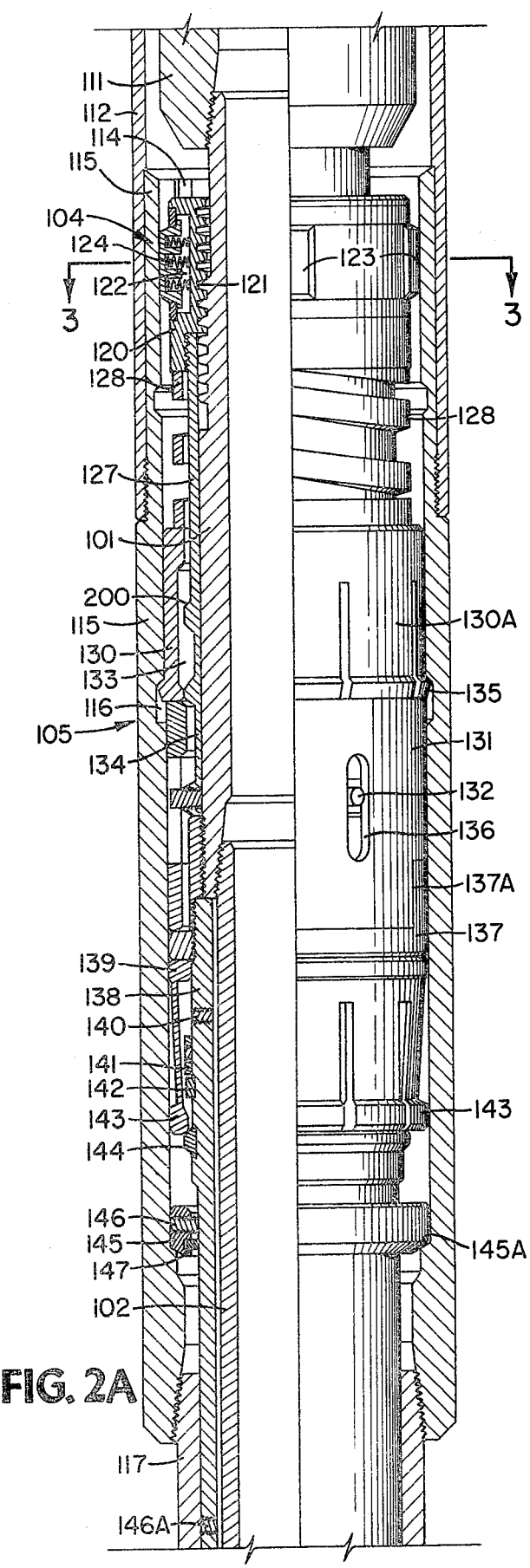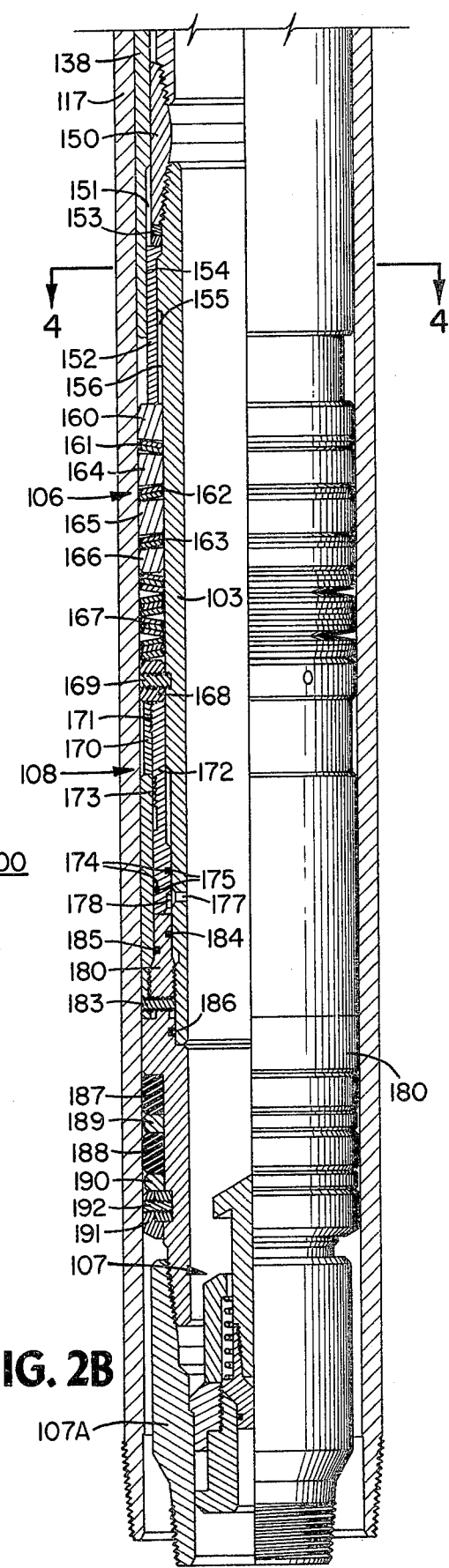
FIG. 2A
FIG. 2B

WELL PACKERS USING METAL TO METAL SEALS

BACKGROUND OF THE INVENTION

1. Field of the Invention

This invention relates to tools for oil wells, gas wells, and the like and more particularly to improved well packers.

2. Description of the Prior Art

A well packer, which is a device for blocking passage of fluids in an annular space between the well tubing and casing, may be used to protect well casing from high production or injection pressures, or from corrosive fluids, to prevent migration of fluids between zones through perforations or casing lengths, to isolate perforations and production in multiple completions, to increase flow efficiency, to maintain artificial lift control or to conserve energy in the reservoir by improved withdrawal rate control.

Most well packers have three main components: (1) a seal assembly for sealing the annular space, (2) a slip assembly for mounting and anchoring the packer in the well, and (3) a setting and release mechanism to apply and maintain, or relieve, the sealing force applied to the seal assembly. These components are often maintained in assembled relation by a mandrel.

An essential characteristic of the packer is that of reliability. Once a packer is installed, it should perform trouble-free for as long as desired. If the packer fails, the expense involved in retrieving and replacing the packer is usually quite high. Packer mechanics and the method by which a seal is maintained are major factors in determining overall packer cost and effectiveness.

Problems with prior art packers include excessive casing damage from slips, as well as slip failure. The slip assembly usually contains slip elements having teeth designed to penetrate into the casing wall and anchor the packer in position under pressure differentials which may exist across the packer. Theoretically, a packer can be seated and unseated a number of times without requiring the replacement of the slip elements. However, if longitudinal packer movement occurs as the slips are released, due to unequalized differential pressure across the packer or due to tubing tension or weight, damage to the casing may occur as well as dulling of the slip teeth. Movement may also result where the slips are corroded from an $H_2S$ or other corrosive environment. The use of worn slips may cause a packer to fail in the well. Further, it is difficult to determine if the slip teeth are adequately sharp by visual inspection, since only a slight dulling can cause packer failure. Normally a packer should not be set at the same place in the casing where milling operations have taken place, or where slips have been engaged and held against a fairly high pressure differential. If damage to the casing has occurred when retrieving prior packers, it may be impossible to adequately seal the casing at the desired depth.

Methods for setting the slips and seal rings in packers include the application of an upward or downward force on a tubing string, actuation by hydraulic pressure, rotation of the tubing string, and use of a J-slot and pin arrangement. Problems transmitting the necessary torque to the packer are encountered with rotation methods. Hydraulic actuation has the problem of pressure fluctuation, with consequent repeated releasing and resetting of the slips into the casing, often resulting in casing damage, movement of the packer, and loss of sealing ability. With tension-type tools, problems may occur due to an inability to stretch the tubing sufficiently to effect normal release of the slips; in other cases where downward force must be applied, the packer may progressively move down to the plugback depth of the well while attempting to release the packer and slips, making it impossible to release the packer.

For greater packer reliability it is essential that the packer have a sealing element which will establish and maintain a seal under producing conditions. Most conventional packers are reliable in wells in normal-to-medium temperature ranges where hydrogen sulfide gas is not being produced. In deep, sour wells, however, hydrogen sulfide gas presents a highly corrosive environment, particularly at high pressures and temperatures, for packer operations and it is often difficult for conventional packers to sustain an effective seal under such conditions.

The packer sealing elements themselves are normally formed of an elastomeric material such as rubber. Typically, when a packer is set, the elastomer sealing element is compressed longitudinally and expanded radially to form a seal against the casing. During compression the elastomeric material tends to extrude between the packer body and the casing. After the packer has been set, retrieval is often difficult due to excessive extrusion of the sealing element. The seals cannot resume their approximate original configuration, which can cause the packer to become stuck, especially in deep wells. This problem is aggravated at high temperatures in such wells. Further, most elastomers, will not sustain an effective seal in a sour gas environment, particularly at high temperatures and pressures. Under these conditions, most elastomer seal rings become brittle, deteriorate or swell and lose sealing capability.

Several elastomeric and synthetic resin materials have been suggested to overcome the degradation effect caused by high temperatures in an $H_2S$ environment. For example, polytetrafluroethylene, sold under the trade name Teflon, and certain fluoroelastomers have good temperature and chemical resistance. However, these materials, like most other elastomers and resins, have certain undesirable mechanical properties. One disadvantage is that under higher temperature conditions it is often difficult to prevent elastomeric and synthetic resin materials from being extruded from even very small clearances in the annular space. Another disadvantage is that some of the suggested seal materials such as Teflon have virtually no elasticity, and therefore are difficult to unseat and retrieve.

SUMMARY OF THE INVENTION

This invention provides improved packers for use in a cased wellbore and alleviates anchoring and sealing difficulties described above. The packers of the present invention are adapted to be run into a cased wellbore on a tubing string and include resilient metallic seal rings, a cylindrical mandrel containing a tubing anchor designed to engage an appropriately fashioned casing anchor collar, a ratchet locking mechanism for maintaining sealing force on the seal rings, and a means for applying force to cause the rings to sealingly engage the casing and the mandrel. The metal seal rings are preferably spaced in nested relationship longitudinally along the mandrel, separated by specially shaped spacer rings. Below the anchor collar is attached a length of casing having a polished bore against which the seal rings are engaged.

When inserting the mandrel assembly in the well, the seal rings are retracted to permit the mandrel to enter the polished bore. Means are provided to expand the seal rings and effect the seal once the packer is properly located in the casing.

A preferred form of the seal rings are frusto-conical, metallic members, similar in shape to Belleville springs. These metal rings, because of their spring characteristics, can be seated and unseated with a high degree of reliability, and yet permit large sealing forces to be developed when setting the packer. Moreover, the metal composition of the rings is resistant to $H_2S$ corrosion.

In the practice of this invention, the well packer can effectively block fluid flow through the annular space between the mandrel and casing under conditions of high pressure, high temperatures and in the presence of hydrogen sulfide. These packers, therefore, will be seen to offer significant advantages over the packers existing heretofore.

BRIEF DESCRIPTION OF THE DRAWINGS

FIGS. 2A and 2B taken together constitute a longitudinal view in section and elevation of another packer embodying the present invention.

DESCRIPTION OF THE PREFERRED EMBODIMENT

Figure 1A:
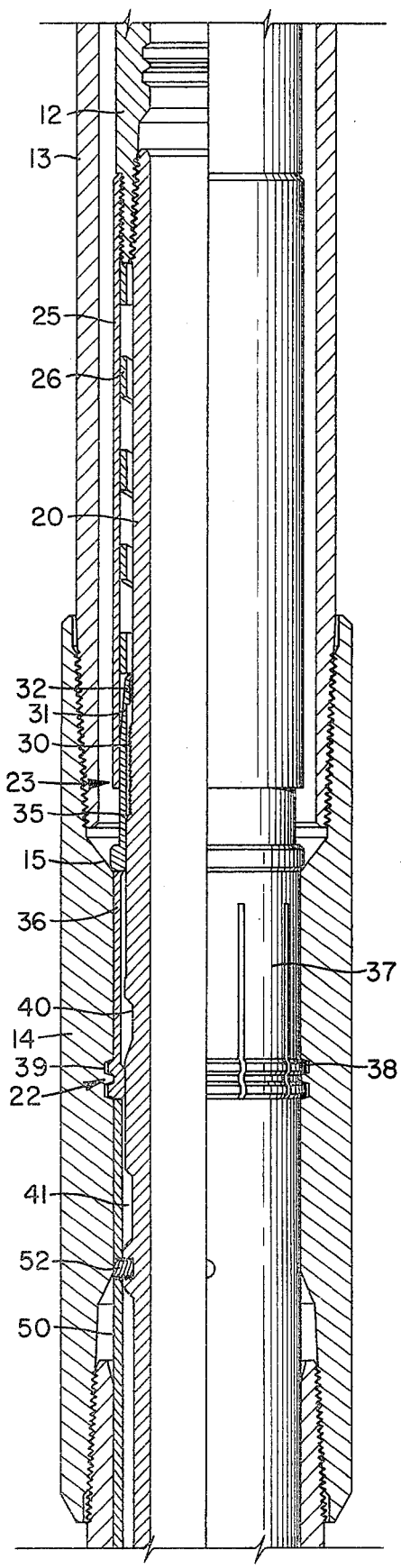
FIGS. 1A and 1B taken together constitute a longitudinal view in section and elevation of a packer constructed according the present invention.
Figure 1B:
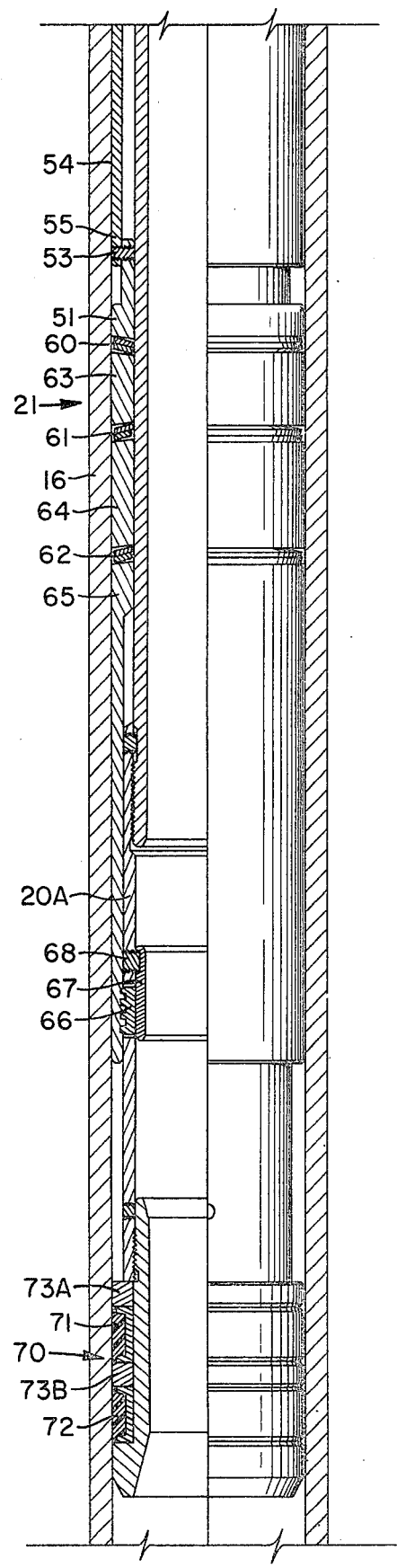

Referring to FIGS. 1A and 1B, a packer 10 is shown coupled to a tubing string by means of a tubing connector 12. The packer 10 is run into a casing string 13, which is provided with an anchor collar 14 having an internal, downwardly convergent shoulder surface 15. The anchor collar 14 has a slightly reduced inner diameter and is connected to a polished bore casing section 16 having the same inner diameter as anchor collar 14.

The main elements of packer 10 include a hollow, tubular member or mandrel 20, a seal assembly 21, an anchor assembly 22 and a ratchet assembly 23. The lower end of the tubing connector 12 is threadedly connected to a mandrel sleeve 25, which forms a sheath around the upper portion of mandrel 20 and extends downwardly to ratchet assembly 23. A spring 26 is disposed in the annular space between mandrel 20 and mandrel sleeve 25, and extends longitudinally from the bottom of tubing connector 12 to the top of outer ratchet sleeve 31.

Ratchet assembly 23 has an outer ratchet sleeve 31 which is provided with a set of internal, upwardly angled, concentric threads 32. Outer ratchet sleeve 31 is initially disposed around mandrel 20 such that threads 32 are located above a set of external, downwardly angled, concentric threads 30 on mandrel 20.

Outer ratchet sleeve 31 abuts collet stop 35, which forms the upper portion of anchor assembly 22. Anchor assembly 22 also includes an anchor collet 36 consisting of a plurality of downwardly extending circumferentially spaced collet fingers 37, each of which has a locking head 38. The seal collar 14 is provided with a locking recess 39 designed to interlock with each locking head 38 of the anchor collet 36. The mandrel 20 is provided with an upper mandrel recess 40 and a lower mandrel recess 41 designed to receive the locking heads 38 when anchoring or retrieving the packer.

A flange 50 is circumferentially disposed around mandrel 20 and extends longitudinally from the bottom of anchor collet 36 to the top seal connector 51. The flange 50 is connected to the mandrel by means of shear pins 52 and to top seal connector 51 by means of shear pins 53. The lower portion of flange 50 has a seating shoulder 54 designed to engage the extension 55 of top seal connector 51 when shear pins 53 are sheared.

Below flange 50 is seal assembly 21. A plurality of frusto-conical resilient metal seal rings 60, 61 and 62 are circumferentially disposed around the mandrel 20 and separated by a top seal spacer 63 and a bottom seal spacer 64. The seal rings are supported on the bottom by the bottom seal connector 65 which is connected to mandrel extension 20A by means of dogs 66; the dogs are held in place by shear sleeve 67 which is, in turn, attached to the mandrel by means of shear pins 68.

At the lower end of mandrel extension 20A is a wiper assembly 70. The wiper assembly is provided with spacers 73A and 73B and two cylindrical fluorocarbon wipers 71 and 72, and serves to clean the polished bore section 16 when lowering the packer into place.

As shown in FIGS. 1A and 1B, well packer 10 has been anchored at the proper vertical height in the casing string, but the seals have not yet been set. In operation, the packer is lowered into the casing string 13 on a tubing string until the locking heads 38 of anchor collet 36 encounter casing shoulder 15. Continued downward force causes anchor collet 36 and outer ratchet sleeve 31 to move upwardly, compressing spring 26, until locking heads 38 move into upper mandrel recess 40. At this point, the well packer may be lowered further until locking heads 38 are opposite locking recess 39 on anchor collar 14. Tension from compressed spring 26 causes the locking heads to engage locking recess 39. The mandrel is moved upward slightly so that the upper mandrel recess 40 is no longer opposite locking heads 38, and tension is held on the outer ratchet sleeve 31 and anchor collet 36 by means of spring 26.

An upward force may be applied on the mandrel to test whether the packer has actually been anchored. If the packer is anchored as shown in FIGS. 1A and 1B, an upward force of about 2600 pounds will cause shear pins 53 to shear and allow shoulder 54 and extension 55 to engage. This procedure senses that the ratchet assembly 23 does not engage prior to the desired setting operation. Thus the ratchet assembly 23 is safely disengaged prior to the initial shearing of shear pins 53. Once the threads 32 and threads 30 of ratchet assembly 23 have initially engaged, setting force is applied by applying an upward force on the tubing string. An upward force of about 12,400 pounds applied to mandrel 20 causes shear pins 52 to shear and permits relative upward movement of mandrel 20 with respect to seal assembly 21. This upward force is transmitted to the bottom seal connector 65 by means of dogs 66 and applied to seal rings 60, 61 and 62. Upward movement of top seal connector 51 is prevented since it directly abuts flange 50 which is held by means of anchor assembly 22. Sufficient upward force is applied to expand the metal seal rings 60, 61 and 62 into sealing engagement with the mandrel 20 and polished bore section 16. This force on the rings is maintained due to engagement of threads 32 and threads 30 of ratchet assembly 23. When the rings are engaged, fluid flow is prevented in the annulus between casing string 13 and the tubing string above seal assembly 21.

When removal of the packer is desired, pressure on the seal rings must be relieved. This is accomplished by lowering a fishing tool on wireline through the inside of the tubing string, down through the mandrel, until shear sleeve 67 is reached. The lower shoulder of shear sleeve 67 is engaged by the tool and an upward force is applied with the wireline. When the applied force is about 6200 pounds, shear pins 68 shear and shear sleeve 67 moves upwardly until its lower edge clears the upper edge of dogs 66. "Jarring" the tubing string causes dogs 66 to disengage bottom seal connector 65, and hence the upward sealing force maintained by ratchet assembly 23 is released. Seal rings 60, 61 and 62 can then resume their original shape, no longer contacting the wall of the polished bore section 16 or the mandrel 20. An upward force on the tubing string is then applied causing mandrel 20 to move upwardly until locking heads 38 are opposite lower mandrel recess 41. Continued upward force causes locking heads 38 to move into the lower mandrel recess 41, thus allowing disengagement of the packer 10 from the anchor collar 14. The packer may then be lifted from the well.

Referring now to FIGS. 2A and 2B, another embodiment of the present invention is illustrated. Packer 100 includes an upper mandrel section 101, a middle mandrel section 102 and a lower mandrel section 103. The mandrel sections maintain in assembled relationship a spline assembly 104, an anchor assembly 105, a seal assembly 106, and a ratchet assembly 108. At the lower end of the lower mandrel section 103 is attached a setting plug assembly 107, which is used when applying hydraulic pressure to set the packer seals.

The packer 100 is connected to the lower end of a tubing string by means of top tubing connection 111 (partially shown), and is lowered into a casing string 112 which includes at its lower end anchor collar 115. Anchor collar 115 has splines 114 which interact with spline assembly 104 when the packer is being operated. A polished bore casing section 117 is connected to the lower end of anchor collar 115.

Figure 3:
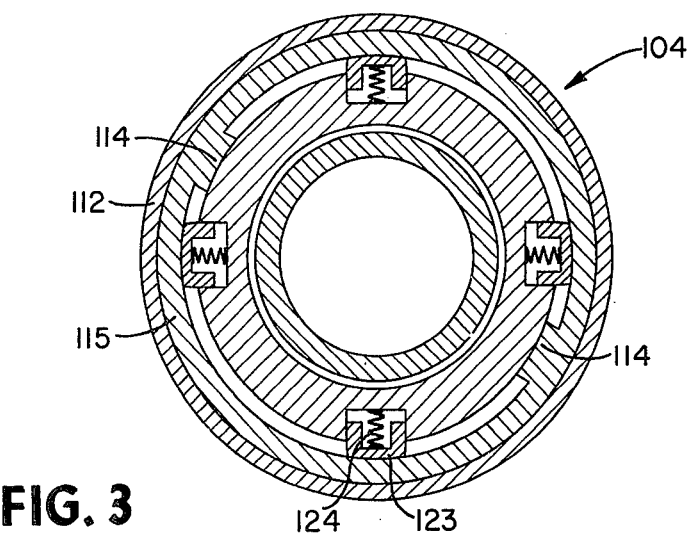
FIG. 3 is a view in section taken generally along the line 3—3 of FIG. 2A.

The purpose of spline assembly 104 is to prevent circumferential rotation of certain packer elements when retrieving the packer. Spline assembly 104 includes a spline nut 120 which is connected by means of left-handed spline threads 121 to the upper mandrel section 101. Disposed in recesses 122 of spline nut 120 are friction dogs 123, which are held in outward tension by springs 124. The relationship of friction dogs 123 and splines 114 is best seen in FIG. 3. Spline nut 120 is also threadedly attached to mandrel extension sleeve 127 which as shown in FIG. 2A, is encircled at its upper end by spring 128. Spring 128 provides tension on certain components of anchor assembly 105 during operation of the packer.

Anchor assembly 105 includes collect latch 130, which consists of a plurality of downwardly extending circumferentially spaced collet fingers 130A, each having a locking head 135. Other components of anchor assembly 105 include mandrel extension sleeve 127, anchor clutch 131, release nut 137, and locator collet 139.

Referring to FIG. 2A in detail, mandrel extension sleeve 127 has two annular recesses, upper recess 133 and lower recess 134, which are utilized when either anchoring or releasing the packer. Locking heads 135, are designed to operatively engage either the anchor recess 116 or the mandrel recess 133 and 134. Pipe plugs 132 are attached to the lower end of mandrel extension sleeve 127 and engage grooves 136, thus allowing limited longitudinal movement of sleeve 127 but not rotational movement. Immediately below and abutting locking heads 135 is anchor clutch 131, which contains the longitudinal grooves 136. Anchor clutch 131 is maintained in assembled relationship by means of release nut 137 which is threadedly attached with left-handed threads to the upper end of backoff mandrel 138 and the lower end of upper mandrel section 101.

Immediately below release nut 137 and encircling middle mandrel section 102 is locator collet 139, which includes a plurality of fingers having locator heads 143 designed to operatively engage anchor recess 116. The function of locator collet 139 is to enable the depth of anchor recess 116 to be precisely determined, prior to performing anchoring and sealing operations.

Figure 5:
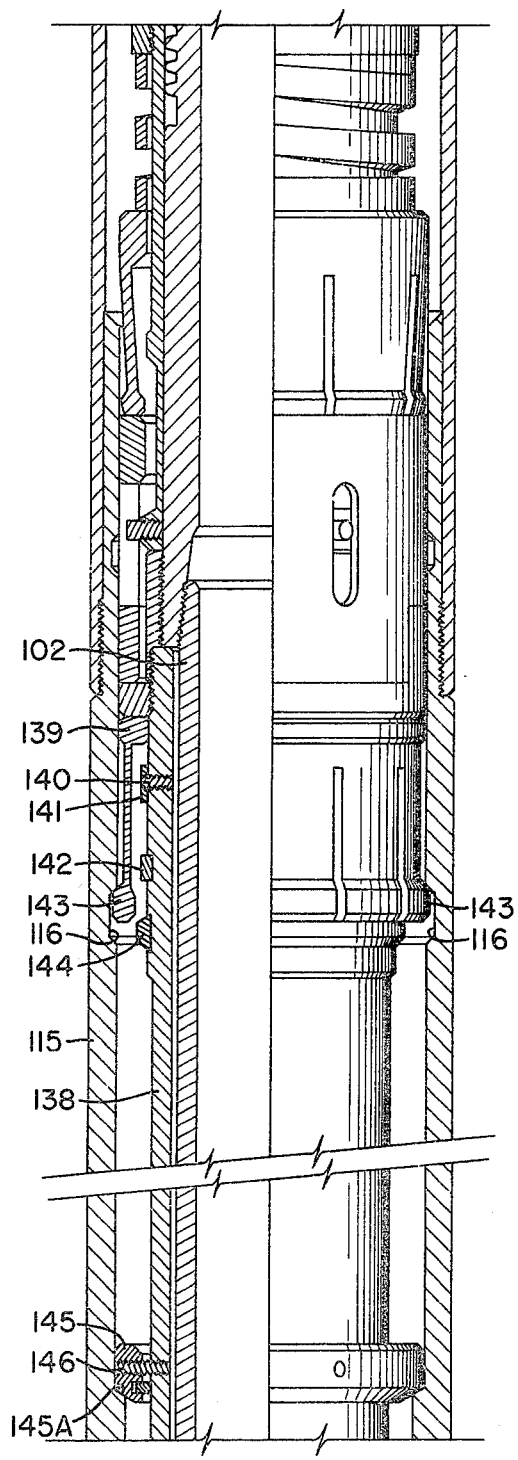
FIG. 5 is a fragmentary longitudinal view in section and elevation of the packer of FIGS. 2A and 2B illustrating one step in anchoring the packer.
Figure 6:
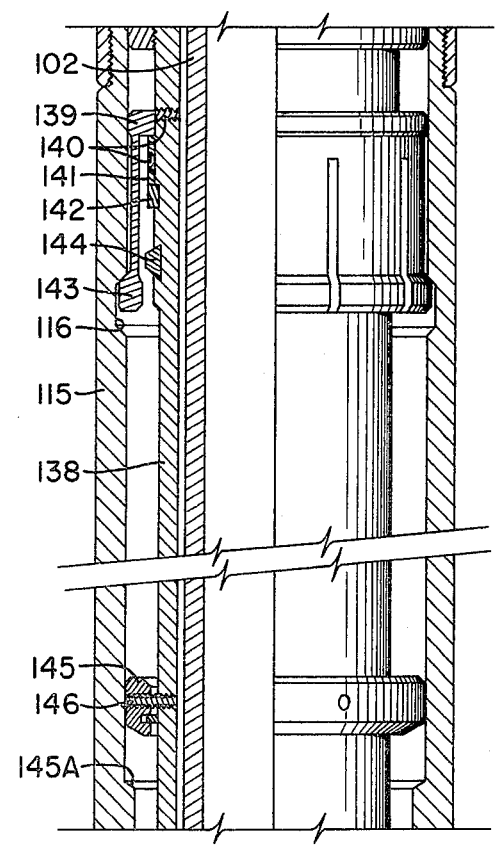
FIG. 6 is a fragmentary longitudinal view in section and elevation of the packer of FIGS. 2A and 2B illustrating another step in anchoring the packer.

As illustrated in FIGS. 2A and 2B, packer 100 has already been anchored at the desired vertical depth and therefore locator collet 139 is no longer functional. Thus shear pins 140, which serve to couple shear ring 141 with backoff mandrel 138, have already been sheared. Shear ring 141, which maintains collet 139 in functional position prior to shearing pins 140, is shown resting at its lower end on shear ring stop 142. (FIG. 5 shows the pins 140 prior to shearing.) Locator heads 143 abut the collet position ring 144. Stop ring 145 is circumferentially disposed around and attached to backoff mandrel 138 by means of shear screws 146 and snap ring 147. Stop ring 145 is utilized when locating anchor recess 116 and also when anchoring the packer. In FIG. 2A shear screws 146 have already been sheared, and the portions attached to backoff mandrel 138 are shown at 146A. (FIGS. 5 and 6 show the screws 146 prior to shearing.)

The backoff mandrel 138 and middle mandrel section 102 may be lengthened as desired by means of appropriate extensions, thus permitting variations in the distance between the anchor assembly 105 and the seal assembly 106. Lower mandrel section 103 is joined to middle mandrel section 102 by means of lower tubing connector 150. Bearing rings 153 abut connector 150 and encircle lower mandrel section 103. Backoff mandrel 138 extends around and below lower tubing connector 150 and abuts top seal adapter 160.

Figure 4:
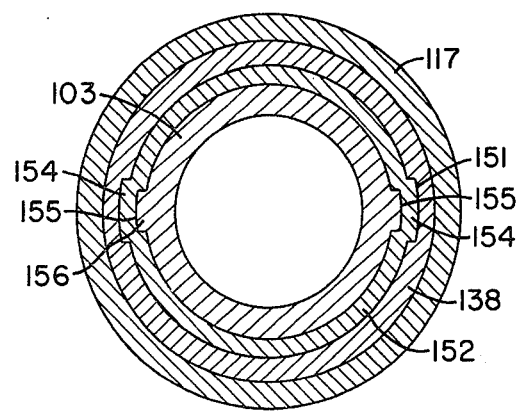
FIG. 4 is a view in section taken generally along the line 4—4 of FIG. 2B.

Referring also to FIG. 4, longitudinal grooves 151 are formed in the lower end of backoff mandrel 138. Sleeve 152, having splines 154 and grooves 155, engages grooves 156 of lower mandrel section 103 and grooves 151, prohibiting relative rotation of backoff mandrel 138 and lower mandrel section 103.

Seal assembly 106 is circumferentially disposed around lower mandrel section 103 and includes, in nested pairs, top seal rings 161, middle seal rings 162 and lower seal rings 163, spaced longitudinally by means of upper seal spacer 164 and lower seal spacer 165. The seal rings and spacers are bounded by top seal adapter 160, which abuts upper seal rings 161, and bottom seal adapter 166, which abuts lower seal rings 163. Disposed immediately below and abutting bottom seal adapter 166 is a plurality of frusto-conical springs 167, which maintain the seal rings, spacers and connectors in tensioned, assembled relationship. The inside and outside diameters of springs 167 are such that, when fully compressed, they do not engage either the polished bore section 117 or lower mandrel section 103. Lower shear ring 168, which is attached to lower mandrel section 103 by means of shear screws 169, maintains Belleville springs 167 in assembled relationship.

Located immediately below lower shear ring 168 is ratchet assembly 108, which includes an outer ratchet sleeve 170 and an inner ratchet sleeve 172. Sleeve 170 has a set of upwardly angled, concentric threads 171 which operatively engage downwardly angled, concentric threads 173 of sleeve 172 when setting the seal rings. Inner ratchet sleeve 172 has two annular recesses 174 which contain rubber "O" rings 175. The "O" rings 175 prevent leakage of hydraulic fluid into the annular spaces formed by the outer ratchet sleeve 170, inner ratchet sleeve 172, and lower mandrel section 103. A cylindrical hydraulic port 177 is located in the lower mandrel section 103 directly opposite the lower end of inner ratchet sleeve 172, which is appropriately contoured at 178 to receive and transmit the force of hydraulic fluid pressure in an upward direction.

Directly beneath inner ratchet sleeve 172 is profile body 180, which couples the outer ratchet sleeve 170 to lower mandrel section 103. Set screws 183 engage both the lower threaded end of outer ratchet sleeve 170, the profile body 180 and lower mandrel section 103 to prevent these components from disengaging. Rubber "O" rings are located in annular spaces 184, 185 and 186 of the profile body 180 to prevent leakage of hydraulic fluid. Wipers 187 and 188, preferably made of a fluorocarbon material, are circumferentially disposed in the annular recess of profile body 180 and serve to clean the polished bore section 117 when lowering the packer into place. Wipers 187 and 188 are separated by means of cylindrical spacer rings 189 and 190 and are maintained in assembled relationship by means of retainer ring 191 which is attached to profile body 180 by set screws 192.

Threadedly attached to the lower end of profile body 180 is setting plug catcher 107A, which contains a no-go type hydraulic sealing assembly 107. Assembly 107 prevents hydraulic fluid flow below setting plug catcher 107A by forcing hydraulic fluid into port 177 when it is desired to set the seal rings on the packer. A suitable hydraulic sealing assembly is commercially available as "Setting Plug and NO-GO Catcher Sub" made by Brown Oil Tools, Inc. The construction and operation of assembly 107 is well known in the art and will not be described further.

The operation of the packer will be described with reference to FIGS. 2A, 2B, 5 and 6. Packer 100 is lowered into a cased wellbore provided with an anchor collar 115 and a polished bore section 117 at the desired vertical depth until locator heads 143 of locator collet 139 engage anchor recess 116; and stop ring 145 engages stop shoulder 145A of seal collar 115. The packer is then in the position shown in FIG. 5. To test whether the packer is properly located within anchor collar 115, an upward force of less than about 16,500 pounds is applied on the tubing string, causing backoff mandrel 138 to move upward. When properly located, the top edge of shear ring 141 engages locator collet 139, while the outer cylindrical surface of collet position ring 144 becomes disposed opposite the inner surfaces of locator heads 143, thus preventing disengagement of the locator heads from anchor recess 116. The packer is now temporarily anchored in place.

Referring to FIG. 6, when an upward force of greater than about 16,500 pounds is applied to the tubing string, shear pins 140 are sheared and shear ring 141 engages shear ring stop 142. At this point locator heads 143 are free to disengage anchor recess 116, since the collet position ring 144 is now above locator heads 143. Packer 100 is then withdrawn from the polished bore section 117. The tubing string above top tubing connection 111 is then lengthened or shortened to properly position the upper end of the tubing string at the wellhead (not shown) and to permit the proper tension to be maintained on the tubing string between the packer and the wellhead when completely connected.

Referring again to FIGS. 2A and 2B, packer 100 is then lowered into the wellbore and polished bore section 117 until stop ring 145 engages stop shoulder 145A. Locator heads 143 may still engage anchor recess 116, but are free to disengage with any longitudinal movement of the tubing string since shear ring 141 is no longer available to position locator heads 143 opposite collet position ring 144. Thus, only stop ring 145 prevents further downward movement of the tubing string 110 and the packer. A downward force of about 16,500 pounds is applied, causing shear screws 146 to shear. The packer is then lowered a measured distance vertically, the downward force on the packer causing the mandrel sections 101, 102 and 103, and mandrel extension sleeve 127 to move downwardly, compressing spring 128 until locking heads 135 move into the upper mandrel recess 133. The packer is then lowered further until locking heads 135 are opposite anchor recess 116 on anchor collar 115. Tension from compressed spring 128 causes the locking head to engage anchor recess 116, thus preventing further substantial longitudinal movement of the packer. As shown, friction dogs 123 may engage splines 114 and serve to prevent extended rotation of certain packer components around the axis of the well when removing the packer.

Metal seal rings 161, 162, and 163 may now be set. Suitable hydraulic fluid is pumped through the tubing string and the mandrel sections. Fluid flow below the setting plug assembly 107 is prevented, and hydraulic pressure within the mandrel is transmitted through hydraulic port 177 to provide an upward force on inner ratchet sleeve 174. When this force exceeds about 6000 pounds, shear screws 169 are sheared, and lower shear ring 168 and inner ratchet sleeve 172 move upward. Springs 167 are fully compressed and transmit an upward force through seal assembly 106, causing the metal seal rings to expand until they sealingly engage the wall of the polished bore section 117 and the lower mandrel section 103. Sealing force is maintained on the seal rings without continued hydraulic pressure when upward movement of inner ratchet sleeve 172 causes ratchet threads 171 and 174 to engage. When engaged, downward movement of the inner ratchet sleeve 172 is prevented relative to outer ratchet sleeve 170. With the seal set, the packer prevents fluid flow in the annulus between casing string 112 and the tubing string above seal assembly 106.

Packer 100, as illustrated in FIG. 2, is partially recoverable and all elements above seal assembly 106, i.e., those elements disposed around and above middle mandrel section 102, may be recovered when desired.

To recover the elements above seal assembly 106, a right-handed torque is placed on the tubing string and hence on upper mandrel section 101, which is connected to release nut 137 by means of left-handed threads. Upper mandrel section 101 begins to disengage from release nut 137 at a rate of one-tenth inch per turn. Release nut 137 is interconnected with anchor clutch 131 at 137A, and is therefore prevented from rotating, since anchor clutch 131 is interconnected by means of pipe plugs 132 with anchored mandrel extension sleeve 127.

While mandrel sections 101 and 102, and lower tubing connector 150, are coupled by means of right-handed threads, lower mandrel section 103 is connected with left-handed threads to connector 150. Therefore, the applied right-handed torque causes the lower mandrel section 103 to disengage lower tubing connector 150, which moves upward at a rate of one-tenth inch per turn.

As previously described, lower mandrel section 103 and backoff mandrel 138 are coupled by sleeve 152. Thus, the applied torque on mandrel section 103 is transmitted through backoff mandrel 138 and applied to the lower end of release nut 137 as left-handed torque. However, since release nut 137 and backoff mandrel 138 are connected by means of left-handed threads, this torque serves only to tighten the connection between these two elements. If the lower threaded connections of release nut 137 and backoff mandrel 138 were not made using left-handed threads, the applied torque would cause backoff mandrel 138 to move downwardly, thereby placing great pressure on the threaded connections of the components being separated, possibly preventing the rotation necessary for retrieval and causing the threads to gall severely. Bearing rings 153 located at the lower end of tubing connector 150 reduce friction when effecting release and allow for easier disengagement.

At the same time the applied right-handed torque causes mandrel sections 102 and 103 to disengage, spline assembly 104 moves upwardly at a rate of one-half inch per turn. This is because spline assembly 104 is connected with left-handed threads 121 to upper mandrel section 101, but prevented from rotating due to engagement of dogs 123 and splines 114. Upward movement of spline assembly 104 lifts mandrel extension sleeve 127 upwardly and causes shoulder 200 on mandrel extension sleeve 127 to engage and move collet latch 130 upward. Locking heads 135 move into mandrel recess 134 and out of anchor recess 116 during upward movement. After spline assembly 104 has moved upwardly about 1½ inches, further upward movement does not occur due to disengagement with threads 121, even though mandrel section 101 continues to rotate. After the tubing has been rotated for about sixteen turns, middle mandrel section 102 is completely disengaged from lower mandrel section 103, while upper mandrel section 101 is only partially disengaged from release nut 137. Therefore, when the tubing string is lifted from the well, all packer elements above lower mandrel section 103, including backoff mandrel 138, are retrieved.

Figure 7:
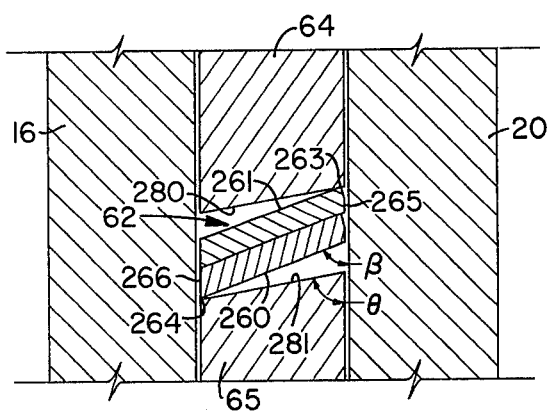
FIG. 7 is an enlarged, fragmentary, sectional view of the seal assembly portion of packers embodying the present invention, illustrating seal rings in the retracted position.
Figure 9:
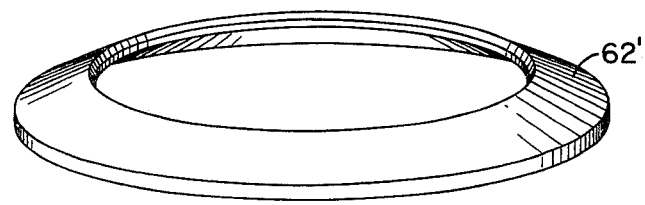
FIG. 9 is a perspective view illustrating a preferred ring useful in the packers illustrated in FIGS. 1A, 1B and 2A, 2B.

In addition to a ratchet assembly for maintaining sealing force and an anchor assembly for maintaining the packer at the proper vertical depth, both packers described above have in common the use of frustoconical, resilient metallic seal rings (e.g. rings 60, 61 and 62). In FIG. 7, a radial section of nested rings 62 in their retracted condition is shown. FIG. 9 illustrates in perspective view a single seal ring 62' used in the practice of the invention. (Reference herein will be to the packer of FIGS. 1A and 1B, but the principles discussed apply to both packers described.) The seal rings are disposed between the lower end of bottom seal spacer 64 and the upper end of bottom seal connector 65. The lower end surface 280 of the bottom seal spacer 64 and the upper end surface 281 of bottom seal connector 65 are parallel and are frusto-conical in shape. These surfaces will be generally referred to hereafter as compression surfaces.

When the seal rings 62 are retracted as in FIG. 7, i.e. not subject to an axial compressive force, the slant or angle of inclination of the compression surfaces with respect to a plane normal to the axis of the seal rings is substantially less than the slant of the frusto-conical surfaces of the seal rings. In other words, the cone angle $\beta$ of the seal rings is smaller than the cone angle $\theta$ of the compression surfaces. Thus, when the seal rings are placed between the compression surfaces, the upper corner 263 and lower corner 264 of the seal rings 62 contact the frusto-conical compression surfaces before the pressure is applied to expand the seal rings into sealing engagement. As shown in FIG. 7, the inner circumferential edge surface 265 of each of the seal rings has a sliding fit on the mandrel 20 and the diameter of the outer peripheral edge surface 266 of the seal rings is slightly less than the inner diameter of the polished bore receptacle 16. The inner and outer frusto-conical surfaces 260 and 261 of the seal rings are parallel. Surface 265, which sealingly engages mandrel 20, is obtained by bevelling or rounding the inner circumferential edge of the frusto-conical rings. Such bevelling reduces the frictional resistance between the seal rings and the mandrel during assembly of the packer, anchoring the packer, and when sealingly expanding the seal rings.

Figure 8:
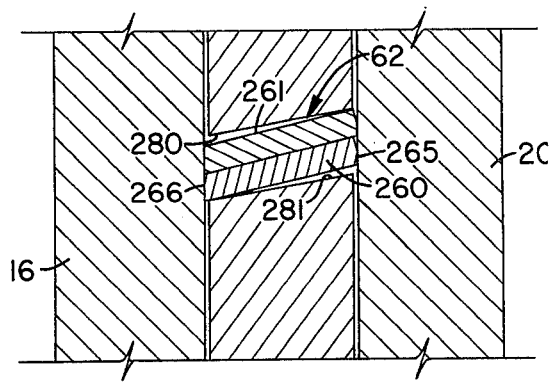
FIG. 8 is an enlarged, fragmentary, sectional view similar to FIG. 7 illustrating the seal rings when sealingly expanded.

In FIG. 8, rings 62 are shown in radial section in the expanded or sealing position. In being stressed, the surfaces 266 and 265 of rings 62 sealingly engage the wall of polished bore section 16 and mandrel 20 respectively.

Seal rings 62, mandrel 20 and polished bore section 16 are constructed from a material which will not appreciably yield when setting the packer. Of course, a slight amount of permanent deformation may occur, but to an extent not apparent with ordinary visual inspection. When the rings 62 are compressed, the outer and inner surfaces 266 and 265 of the rings will be in sealing engagement over substantially the entire edge surface. A seal results because the transverse contact pressure between the surfaces 266 and 265 of the seal rings and the mandrel and polished bore section is greater than the pressure differential across the packer.

An advantageous feature of the frusto-conical metal seal rings 60, 61 and 62 is that a large mechanical advantage can be obtained to exert a transverse sealing force inwardly and outwardly at the circumferential edge surfaces to form the seal between the mandrel and the polished bore section. Due to the spring characteristics and rigid nature of such frusto-conical metal rings, when loaded by an axial compressive force on the inner circumference, the highest stresses occur at the inner and outer edge surfaces. A nonuniform elastic stress distribution is obtained, giving a large mechanical advantage in sealing. Because of the geometry and physical characteristics of the seal rings, the axial compressive force is related to the transverse sealing force tangentially according to the ring cone angle ($\beta$). As the cone angle becomes larger by application of an axial compressive force, the ratio of the transverse sealing force to the compressive force (mechanical advantage) becomes larger. Values of this ratio as a function of ring cone angle are shown in Table I. Preferably, the ratio of sealing force to compressive force is at least 1.7 when effecting a seal. Choice of slant angles, seal ring material, and deflection limits must be carefully made, however, so that the stresses at the circumferential edge surfaces do not exceed the elastic limit of the metals and result in appreciable flow. When properly designed, tremendous sealing forces may be obtained without appreciably reducing the elastic nature of the seal ring. With elastomeric seal rings of the prior art, a different sealing mechanism operates, i.e. the seal depends on extrusion and high extruded edge contact with the walls, and hence the requisite ring rigidity is unavailable to obtain the large mechanical advantage of the present invention.

TABLE I

RATIO OF SEALING FORCE TO COMPRESSIVE FORCE AT DIFFERENT RING CONE ANGLES

| Ring Cone Angle ($\beta$, Degrees) | Sealing Force/Compressive Force |
|---|---|
| 60° | 1.7 |
| 65° | 2.1 |
| 70° | 2.7 |
| 72° | 3.1 |
| 74° | 3.5 |
| 76° | 4.0 |
| 78° | 4.7 |
| 80° | 5.7 |
| 82° | 7.1 |
| 84° | 9.5 |
| 86° | 14.3 |

Preferably, the compression surfaces have an angle $\theta$ of between about 80° and 82°, and the seal rings when retracted have an angle $\beta$ of between about 60° and about 75°, and are expanded through an angle of between about 2° to about 10° when effecting a seal. Note that upon sealing engagement, compression surfaces 280 and 281 preferably do not touch ring surfaces 260 and 261. This provides some leeway when setting the seal rings, and also has been found to facilitate release when retrieval of the packer is desired.

In order that the seal rings may be fitted within the polished bore section, the diameter of the peripheral edge surface of the ring should be slightly less than the inner diameter of the polished bore section. In most applications the distance may be between about 0.001 and about 0.05 inches. The inner circumferential edge surface of the rings should have a diameter so as to form a snug fit over the mandrel.

The seal rings 60, 61 and 62 are substantially rigid, yet resilient, and are formed of a material substantially as hard or harder than that from which the casing or mandrel is formed. Generally, the material has a Brinnel hardness of at least about 321 (based on a Brinnel scale of 3,000 Kg). The rings may be formed of the same material as the polished bore section and mandrel. The metal used to form the rings should be an elastic or resilient material, i.e., the rings should have the ability to deflect or distort under load and substantially recover their original shape when released after being distorted. The edge surface of the rings should not yield appreciably when sealing pressure is applied.

In the preferred embodiments, the frusto-conical metal seal rings are circumferentially disposed around the mandrel and spaced longitudinally in nested groups of two. Use of the term "nested" is meant to define the relationship where the frusto-conical surfaces of the seal rings forming any given group of rings are parallel. Frusto-conical rings in nested relationship require a greater load to cause deformation than a single ring. While the nested relationship is typically used to obtain a stiff, yet flexible spring, a different function is served in the present invention. Tests have shown that, when applying sealing force to a single ring, the outer and inner circumferential edge of the ring will occasionally "dig into" or penetrate the wall of the polished bore section and the mandrel, instead of forming a seal at the inner and outer edge surfaces of the ring. This is believed to be due to a slight cocking or tilting of the ring prior to application of sealing force, resulting in an uneven load being applied. The problem was overcome by nesting the frusto-conical rings. The nested relationship maintains the rings in their centered disposition and thus prevents them from cocking. This allows a uniform load to be applied, resulting in the desired seal.

In the preferred embodiments, three groups of frusto-conical seal rings are spaced longitudinally along the mandrel. The lower two groups tend to resist an upward force resulting from pressure below the packer, while the upper group tends to resist a downward force from pressure above the packer. Sealing force is applied upwardly at the lower circumferential edge of the bottom group of seal rings to cause expansion and sealing engagement of all groups of rings. Due to frictional resistance and the spring characteristics of the spacers and seal rings, the actual load placed upon the upper groups becomes progressively less. Tests showed that where rings of equal thickness are used in each group, application of upward sealing force sometimes results in the engagement of the lower group with the mandrel and polished bore section prior to engagement of the upper groups. When this happens, it is extremely difficult to safely apply enough force to cause the upper two groups of rings to seal. Ring "thickness", as used herein, means the distance between the parallel inner and outer frusto-conical surfaces of a given ring. Use of rings having lesser thickness in each successively higher group allows equivalent deflection or expansion of all three groups of rings, even though a different actual load is applied to each group. Since equivalent deflections are obtained, sealing engagement occurs at the same time.

To form an effective seal, the seal rings 60, 61 and 62 should be formed of metal which withstands any radial fluid pressure that may be encountered in the wellbore and which is resistant to corrosion. In practice, any metal which has suitable resiliency, hardness and corrosion resistance may be used. Preferably, the metals used to form the rings are highly alloyed nickel or cobolt base austenitic stainless materials such as MP35N and MP159 made by Latrobe Steel; Inconel Alloys 625, 718, and X-750 made by Huntington Alloys; and C-276, C, and C-4 alloys made by Stellite Division of Cabot Corporation. These metals are corrosion resistant and are suitable for use in wells where hydrogen sulfide gas is produced under high temperature and pressure conditions. Seals constructed from these materials are also able to substantially resume their original shape after sealing pressure is released, thus allowing retrieval of the packer. As an additional advantage, these particular metals are work hardened during compression. That is, as the seal rings are wedged tighter between the mandrel and casing, the tensile strength of the metal increases, thus increasing the ability of the packer to seal the annular space against high fluid pressure.

The seal collars previously described may be furnished in a variety of types and the polished bore casing section attached thereto provided in varying lengths to fit specific well installations. A polished bore section having a bore diameter slightly less than the inner casing diameter above the seal collar is preferred. It is further preferred that the wall of the polished bore section be honed to a smooth finish to provide a good sealing surface for the seal rings. As mentioned, the length of the polished bore section can be varied to accomodate any packer length. Because of the temperature and pressure variations in the drill pipe, it is also preferred that the length of the polished bore section be twice the anticipated tubing contraction or expansion and about twice as long as the mandrel. Finally, it should be understood that the anchoring means described in the preferred embodiments are only two of several types which could be used to positively anchor the mandrel at a desired depth without the use of slips.

It should be appreciated from the foregoing discussion that although a more positive seal and greater reliability is obtained by using a multiplicity of rings or set of rings, as in the preferred embodiments, one seal ring would provide a casing-tubing annular seal.

It will be understood that the packers of this invention are not restricted to the precise configurations illustrated in the drawings and that various changes in the shape or type of mandrel, ratchet assembly, anchor assembly, or metal sealing elements may be made.

What is claimed is:

1. A packer for insertion into a well casing which includes an anchor collar and a length of polished bore section located at a predetermined depth in the well, the packer comprising:
    (a) a hollow, cylindrical mandrel;
    (b) a resilient, frusto-conical rigid metal seal ring circumferentially disposed around said mandrel, said ring being sufficiently rigid such that application of an axial compressive force on the ring is capable of sustaining at the circumferential edge surfaces of the ring a transverse sealing force which exceeds said compressive force;
    (c) means for retracting said seal ring for passage through said casing;
    (d) means for anchoring said packer on said anchor collar, said seal ring being disposed within said length of polished bore section with said packer anchored;
    (e) means for expanding said seal ring into sealing engagement with said mandrel and said casing, and for applying sufficient force for effecting fluid tight metal-to-metal seals thereon; and
    (f) means for maintaining sealing force.

2. The packer as defined in claim 1 wherein said seal ring is frusto-conical in shape, having inner and outer downwardly tapering surfaces.

3. The packer as defined in claim 2 wherein the inside circumferential edge of said seal ring is beveled.

4. The packer as defined in claim 2 wherein the inner and outer frusto-conical surfaces of said seal ring have an angle of slant relative to the ring axis from about 60° to about 75° when said ring is in its retracted position.

5. The packer as defined in claim 4 wherein said seal ring has an angle when expanded of between about 2° and about 10° greater than said angle of slant when retracted.

6. The packer as defined in claim 4 wherein said inner and outer surfaces are parallel to each other.

7. A packer as defined in claim 1 wherein said seal ring is formed of a resilient metal at least as hard as the material of said mandrel.

8. A packer as defined in claim 1 wherein said seal ring is formed of a resilient metal having a Brinnel hardness of at least about 321, based on a Brinnel load of 3000 kg.

9. The packer as defined in claim 1 wherein a plurality of frusto-conical, resilient metal seal rings are circumferentially disposed around and spaced longitudinally along said mandrel.

10. A packer as defined in claim 1 wherein said means for interlocking said packer with said anchor collar include mated latching components, one of said components being located on said anchor collar and the other component being located on said packer.

11. The packer as defined in claim 10 wherein said means for maintaining sealing force comprises an outer, hollow cylindrical member and an inner hollow, cylindrical member, one of said members having a fixed position with respect to said mandrel, said outer member circumferentially disposed around said inner member and said mandrel such that when an upward force is applied to said inner member, engagement with said outer member occurs so as to prevent downward longitudinal movement of said inner member relative to said outer member.

12. The packer as defined in claim 11 wherein said outer member has a set of upwardly angled, inner concentric threads and said inner member has a set of downwardly angled, outer concentric threads, said outer concentric threads engaging said inner concentric threads upon application of said upward force.

13. A packer for a cased wellbore wherein the packer is used to seal an annular space between tubing and casing in said wellbore, the packer which comprises:
    (a) a cylindrical, tubular mandrel for insertion into said cased wellbore,
    (b) anchoring means for engaging said packer with said casing at a specific vertical depth,
    (c) a plurality of frusto-conical, resilient metallic seal rings circumferentially disposed around and spaced longitudinally in groups of at least two along said mandrel, the frusto-conical surfaces of said rings parallel to each other, said rings being sufficiently rigid such that application of an axial compressive force on the rings is capable of sustaining at the circumferential edge surfaces of the rings a transverse sealing force which exceeds said compressive force,
    (d) means for elastically deforming said rings until sealing engagement with the walls of said mandrel and said casing occurs, and
    (e) means for maintaining said sealing engagement.

14. The packer as defined in claim 13 wherein the uppermost group of seal rings is inverted relative to the lower groups, the inner circumference of said uppermost group being located below the outer circumference of said uppermost group when said packer is disposed in said well-bore.

15. The packer as defined in claim 13 wherein the distance between the inner and outer frusto-conical surfaces of the seal rings is greater in a lower group than said distance in an upper group.

16. A well packer for sealing the annular space between tubing and casing in a well which comprises:
(a) a longitudinally extending mandrel adapted to be lowered into said casing on said tubing:
(b) means for anchoring said packer to said casing;
(c) a plurality of frusto-conical, resilient metal seal rings encircling said mandrel, said rings being arranged in a stacked and nested relationship, and said rings being sufficiently rigid such that application of an axial compressive force on the rings is capable of sustaining at the circumferential edge surfaces of the rings a transverse sealing force which exceeds said compressive force;
(d) means for applying force to said rings such that said rings are expanded into sealing engagement with said mandrel and said casing, and
(e) means for maintaining said force.

17. A packer for insertion into a well casing which includes an anchor collar and a polished bore casing section located at a predetermined depth in a well, said packer comprising:
a mandrel;
a seal assembly encircling said mandrel and including a plurality of resilient, metal, frusto-conical seal rings, said assembly being movable relative to said mandrel, said seal rings having a normal retracted position, and said rings being sufficiently rigid such that application of an axial compressive force on the rings is capable of sustaining at the circumferential edge surfaces of the rings a transverse sealing force which exceeds said compressive force;
means for anchoring said seal assembly on said anchor collar with said seal rings positioned in said polished bore section;
means for moving said mandrel longitudinally relative to said seal assembly to a set position such that an axial compressive force is applied to said seal rings causing said rings to be expanded radially outwardly into sealing engagement with said polished bore section and radially inwardly into sealing engagement with said mandrel;
means for maintaining said mandrel in said set position.

18. The packer as defined in claim 17 wherein said seal assembly includes at least two downwardly opening frusto-conical seal rings arranged in nested relationship, the angle of slant of the outer surface of said seal rings relative to the ring axis being between about 60° and about 75° in the retracted position of said rings and being about 2° to about 10° greater in the set position of said mandrel.

19. The packer as defined in claim 17 wherein said seal rings are adapted to engage said mandrel and said polished bore section with a sealing force of at least about 1.7 times the applied compressive force.

20. The packer as defined in claim 17, further including means for returning the mandrel to its original position such that said resilient seal rings can return to their retracted position.

21. The packer as defined in claim 17 wherein said means for maintaining said mandrel in said set position includes a threaded section attached to said seal assembly, a threaded section attached to said mandrel, said threaded sections being adapted to interengage as said mandrel is moved to said set position.

22. The packer as defined in claim 17 wherein said seal assembly includes a plurality of double nested seal rings spaced longitudinally along said mandrel.

23. The packer as defined in claim 22 wherein at least one set of double nested seal rings is disposed in opposite direction to the remaining sets of rings.

24. The packer as defined in claim 1 wherein said ring comprises an alloy nickel based austenitic stainless material.

25. The packer as defined in claim wherein said seal ring comprises an alloy cobalt based austenitic stainless material.

26. The packer as defined in claim wherein said seal ring is formed of a corrosion-resistant metal which will not yield appreciably when said seal ring is in sealing engagement with said mandrel and said casing.

27. The packer as defined in claim 26 wherein said seal ring is formed on a corrosion-resistant metal which will deflect under load and substantially recover its original shape after removing said load.

* * * * *

UNITED STATES PATENT OFFICE
CERTIFICATE OF CORRECTION

PATENT NO. : 4,127,168
DATED : November 28, 1978
INVENTOR(S) : Harry R. Hanson, et al.

It is certified that error appears in the above-identified patent and that said Letters Patent are hereby corrected as shown below:

In the drawing, Sheet 5, FIGURE 8, the reference numeral "2C" should be replaced with --20--.

In the specification, column 4, line 65, delete "senses" and insert therefor --ensures--.

In claim 25, line 36, after "claim" insert --1--.

In claim 26, line 39, after "claim" insert --1--.

In claim 27, line 44, delete "on" and insert therefor "of".

Signed and Sealed this

Twenty-sixth Day of February 1980

[SEAL]

Attest:

SIDNEY A. DIAMOND

Attesting Officer

Commissioner of Patents and Trademarks